United States Patent [19]

Quioque et al.

[11] 3,986,094
[45] Oct. 12, 1976

[54] LOGIC SYSTEM FOR PRINT BALL TILT CONTROL

[75] Inventors: Virgilio J. Quioque, Northville; Cornelius Eldert, Ypsilanti; John L. Worst, Grand Rapids, all of Mich.

[73] Assignee: Burroughs Corporation, Detroit, Mich.

[22] Filed: July 1, 1974

[21] Appl. No.: 485,006

[52] U.S. Cl. .............................. 318/696; 178/23 R; 318/695
[51] Int. Cl.² ....................................... G05B 19/40
[58] Field of Search .......... 318/685, 696; 178/23 R, 178/23 A, 34

[56] References Cited
UNITED STATES PATENTS

| | | | |
|---|---|---|---|
| 3,789,971 | 2/1974 | Deyesso et al. | 318/685 X |
| 3,801,891 | 4/1974 | Davenport | 318/685 X |
| 3,816,656 | 6/1974 | Ludwig | 178/34 |
| 3,843,917 | 10/1974 | Hoffman | 318/696 |

OTHER PUBLICATIONS

IBM Technical Disclosure Bulletin, J. Mako, "Feedback Control of Torque of a Stepper Motor," vol. 16, No. 1, June 1973, pp. 246–248.
IBM Technical Disclosure Bulletin, G. J. Dohanich, Jr., "Digital Acceleration–Position Control of DC Motor," vol. 14, No. 6, Nov. 1971, pp. 1918–1919.
IBM Technical Disclosure Bulletin, D. G. Abraham et al., "Stepping Motor Control System," vol. 14, No. 9, Feb. 1972, pp. 2840–2841.
IBM Technical Disclosure Bulletin, R. A. McSparran, "Stepping Motor Control," vol. 16, No. 9, Feb. 1974, pp. 2859–2862.

Primary Examiner—James R. Scott
Attorney, Agent, or Firm—Ronald L. Taylor; Leon E. Redman; Edwin W. Uren

[57] ABSTRACT

A logic system for controlled energization of predetermined stepper motor phases for various optimal times employing a read only memory having a plurality of memory element arrays corresponding to predetermined stepper motor sequencing commands corresponding to all possible tilt position change attempts for a print head. The memory element arrays are addressed by a shift register which stores data representative of the previous print head tilt position and the destined print head tilt position as provided by a two bit latch. The addressed memory element array is sequenced by a counter incrementing the read only memory address provided by the shift register at various predetermined optimal time intervals provided by a timer which is preset by individual preset values stored in the memory element now being addressed.

19 Claims, 11 Drawing Figures

FIG. I.

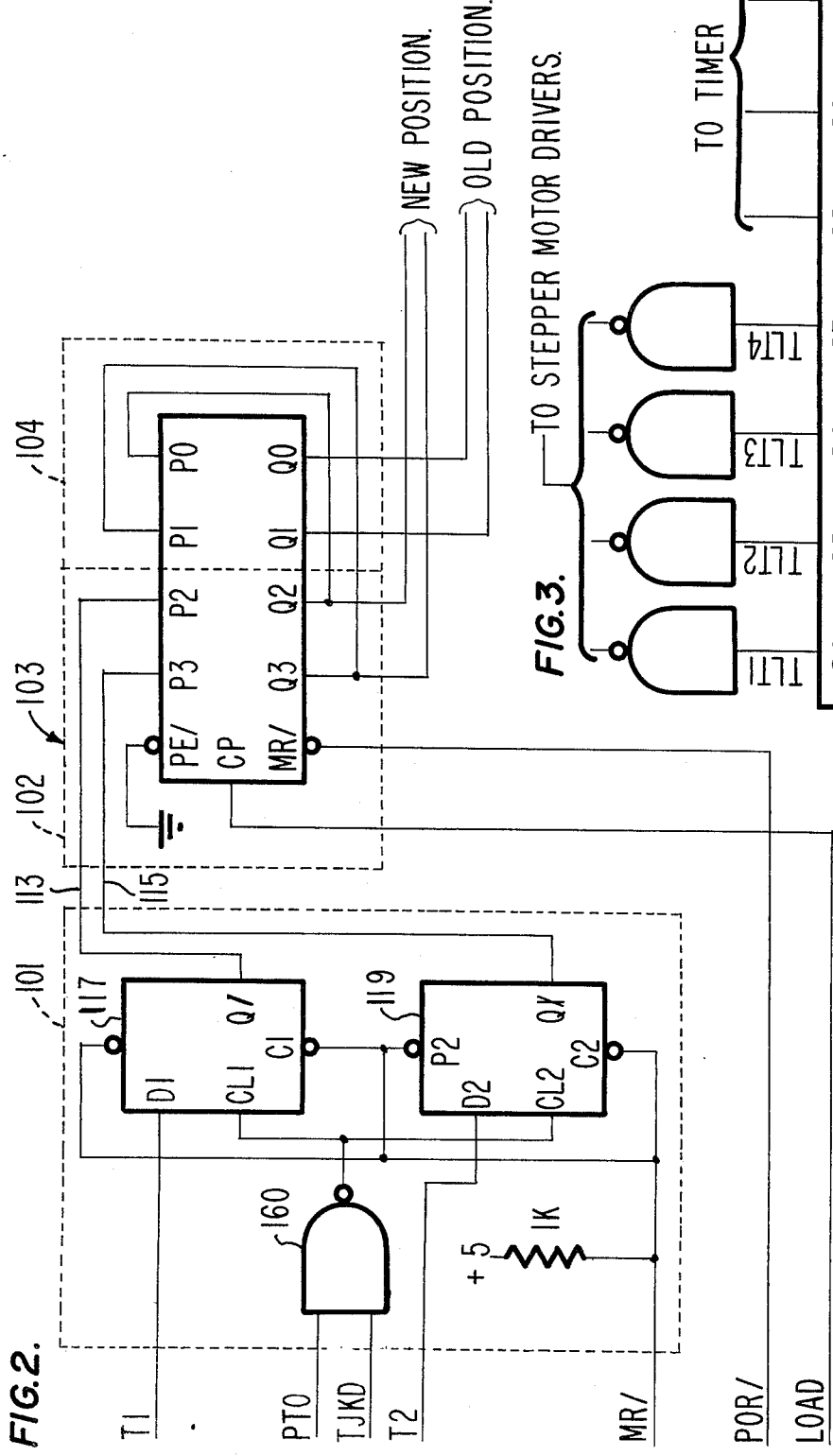
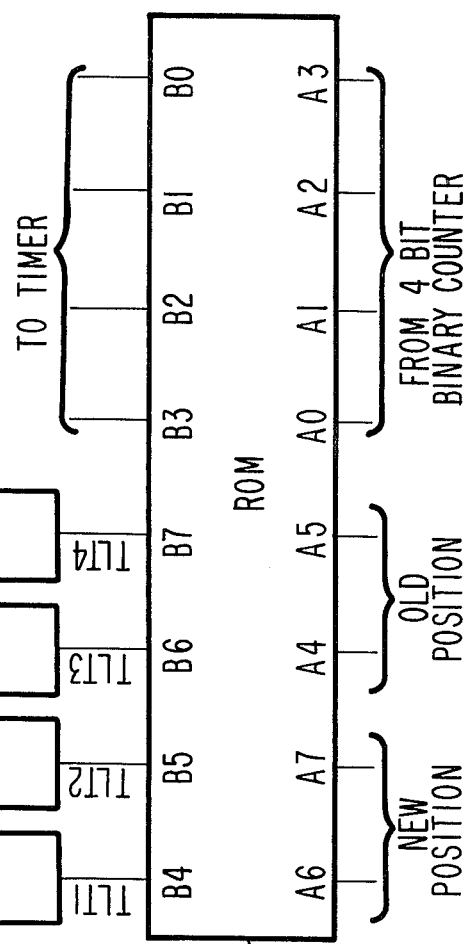
FIG.2.
FIG.3.

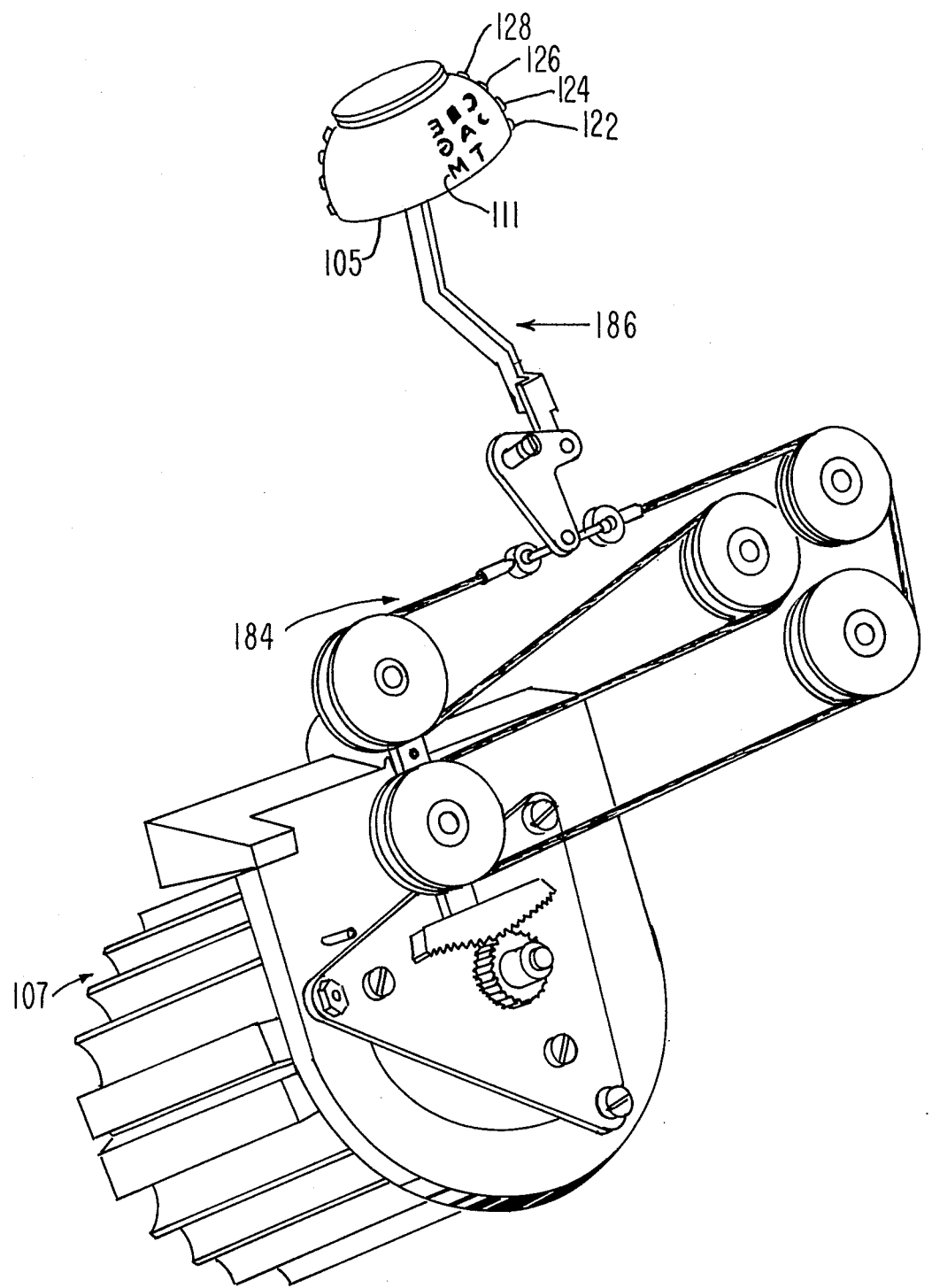
FIG.II.

LOGIC SYSTEM FOR PRINT BALL TILT CONTROL

BACKGROUND OF THE INVENTION

The invention relates generally to a digital logic system for controlled sequencing of a stepper motor and more particularly for controlling the tilt position of a print head in a high speed printer.

While stepper motors have been used in a variety of devices, including printing devices, the dichotomy of optimizing the stepper motor speed and yet at the same time effectively damp the servo motor at the final position has remained a problem that until the present invention could not be solved without complicated and expensive feedback means from the step motor to the motor control in a closed-loop servo system. Examples of a closed-loop servo mechanisms for electronically damping a servo motor as it approaches its final position are disclosed in U.S. Pat. Nos. 3,573,589 and 3,760,252 of common ownership herewith.

In the past the tilt position of a print head has been controlled by a mechanical decoder which mechanically controlled the direction and degree of rotation of a print head in accordance with information received by a pair of solenoids which were energized in accordance with the desired tilt position of the print head for the character to be printed. The overall print speed of the printer was limited to the speed in which the various mechanisms employed in the mechanical decoder could be actuated. Furthermore, these mechanisms in the mechanical decoder were expensive to fabricate, noisy in operation and required a great deal of maintenance.

SUMMARY OF THE INVENTION

Accordingly, it is a primary object of this invention to control the tilt position of a print head in a faster, less expensive, quieter and more reliable manner.

It is also an object of this invention to provide smooth transition between steps of a multi-phase stepper motor while preventing any overshoot or oscillation about the final position to which it is being rotated and yet arrive rapidly at that final position.

A further object of this invention is to provide effective control of the stepper motor with a minimum of electronic components while completely obviating either electronic or mechanical feedback from the stepper motor.

In accordance with the invention, a digital logic system for open loop control of a stepper motor has been provided with a memory device for storing in separate memory element arrays individual stepper motor commands for rotating the stepper motor in a desired sequence with optimal timing for each of the commands and means for addressing predetermined memory element arrays in accordance with information representative of the present stepper motor position and the next desired stepper motor position.

Various additional objects, advantages and features of the present invention will become more fully appreciated when considered with the following detailed description, the appended claims and the accompanying drawings.

BRIEF DESCRIPTION OF THE DRAWING

FIG. 2 is a schematic diagram of the latch circuit and NEW POSITION/OLD POSITION register employed to address a particular memory element array;

FIG. 3 is a schematic diagram illustrating the organization of inputs to the memory device which stores the memory element arrays and the outputs therefrom;

FIG. 11 is a perspective view of a linkage and pulley system which could be employed for coupling the stepper motor to the print head.

DETAILED DESCRIPTION

Figure 1:
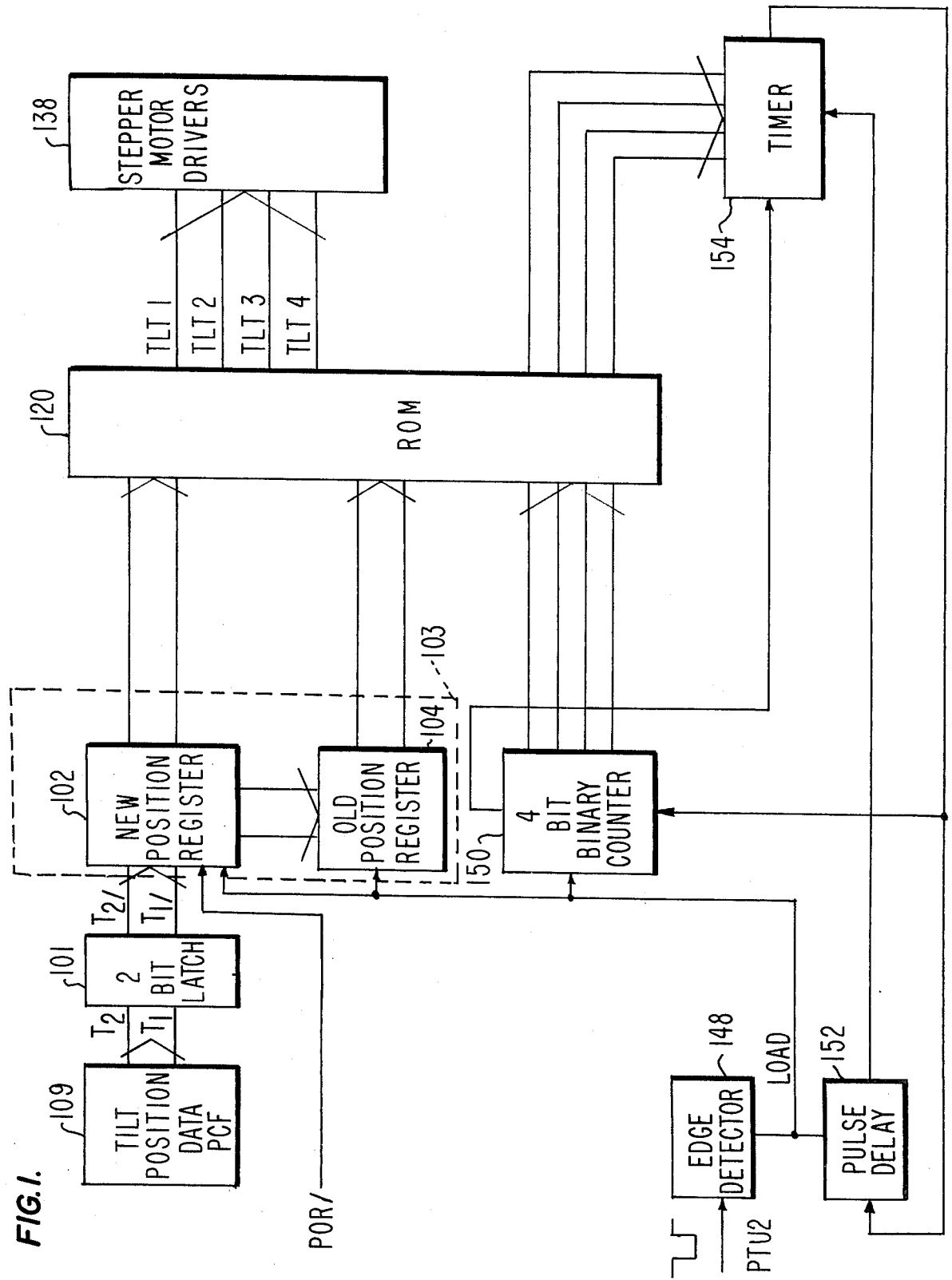
FIG. 1 is a block diagram illustrating the digital logic open loop control circuit of the present invention.

Referring to FIG. 1, a printer carrier forms control logic system 109 generates information for the tilt control of the print ball 105 (FIG. 11) in accordance with the desired character 111 to be printed. The tilt control system two bit latch 101 receives tilt position data from the printer carrier forms control logic system 109, designated PCF, on bit lines T1 and T2. The two bit position data on lines T1 and T2 represents the desired tilt position of the print ball 105 for whatever character 111 is to be printed. This tilt position, as previously mentioned, is a number in the form of a two bit code which is received by the tilt control system on lines T1 and T2. This information is valid for only a short period of time in comparison with the timing requirement of the tilt control system. Therefore, it is necessary to latch onto the two bit PCF code T1 and T2 during the time it is known valid, which is at the coincidence of a PTO pulse and TJKD pulse at NAND gate 160 (FIG. 2), for later use by the tilt control logic system. In the preferred embodiment the Q/ outputs 113, 115 are taken from a pair of D-type flip flops 117, 119 enabled by the output of NAND gate 160. The Q/ output of the two bit latch is the 1's complement of whatever PCF code was latched during its valid period. This output of the two bit latch 101 is designated T1/ and T2/. Data T1/ and T2/ is inputted to the P2 and P3 inputs of the NEW POSITION portion 117 of the NEW POSITION/OLD POSITION shift register 103.

Table 1 below illustrates the PCF two bit binary code on lines T1 and T2 along with the 1's complement of that code for the four print ball tilt positions corresponding to character rows 122, 124, 126, 128 (FIG. 11) labeled in Table 1, ROW 3, ROW 2, ROW 1 and ROW 0, respectively.

TABLE 1

| Print Ball Tilt Position | PCF Code | | 1's Complement | |
|---|---|---|---|---|
| | T1 | T2 | T1/ | T2/ |
| ROW 0 | 0 | 0 | 1 | 1 |
| ROW 1 | 0 | 1 | 1 | 0 |
| ROW 2 | 1 | 0 | 0 | 1 |
| ROW 3 | 1 | 1 | 0 | 0 |

Table 2 below sets fourth all possible combinations of print ball tilt change attempts for the tilt positions given in Table 1, along with the corresponding two bit binary representation of the PCF code for each new and old tilt position combined into a four bit binary representation of each possible print ball tilt change attempt.

TABLE 2

| Print Ball Tilt Change Attempt | | | | | |
|---|---|---|---|---|---|
| Tilt Position | | PCF Code | | | |
| New | Old | New | | Old | |
| | | (T1 | T2) | (T1 | T2) |
| ROW 3 | ROW 3 | 1 | 1 | 1 | 1 |
| ROW 3 | ROW 2 | 1 | 1 | 1 | 0 |
| ROW 3 | ROW 1 | 1 | 1 | 0 | 1 |
| ROW 3 | ROW 0 | 1 | 1 | 0 | 0 |
| ROW 2 | ROW 3 | 1 | 0 | 1 | 1 |
| ROW 2 | ROW 2 | 1 | 0 | 1 | 0 |
| ROW 2 | ROW 1 | 1 | 0 | 0 | 1 |
| ROW 2 | ROW 0 | 1 | 0 | 0 | 0 |
| ROW 1 | ROW 3 | 0 | 1 | 1 | 1 |
| ROW 1 | ROW 2 | 0 | 1 | 1 | 0 |
| ROW 1 | ROW 1 | 0 | 1 | 0 | 1 |
| ROW 1 | ROW 0 | 0 | 1 | 0 | 0 |
| ROW 0 | ROW 3 | 0 | 0 | 1 | 1 |
| ROW 0 | ROW 2 | 0 | 0 | 1 | 0 |
| ROW 0 | ROW 1 | 0 | 0 | 0 | 1 |
| ROW 0 | ROW 0 | 0 | 0 | 0 | 0 |

The NEW POSITION/OLD POSITION shift register 103 is cleared by the POR/ signal, thereby enabling the first timing pulse, designated PTU2, to load the T1/ and T2/ data into the NEW POSITION portion 102 of the shift register 103. This same PTU2 pulse also loads the information from the shift register's NEW POSITION portion 102 into the OLD POSITION portion 104. Then the OLD POSITION portion 104 will contain the information which had been in the NEW POSITION portion 102 just prior to receipt of the PTU2 timing pulse. This information contained in the OLD POSITION portion 104 represents the present tilt position of the print ball while the information contained in the NEW POSITION block portion 102 represents the next desired or destined tilt position corresponding to the two bit code being temporarily held in the two bit latch 101.

The new and old tilt position data stored in the NEW POSITION/OLD POSITION shift register 103 is employed to address a storage device in which all possible combinations of tilt position change commands are stored. In the preferred embodiment of the invention the storage means comprises a silicon gate MOS monolithic read only memory 120, hereinafter designated ROM. It contains at least 2048 bits organized as a 256 × 8 bit word. It is further preferred that all ROM inputs and outputs be DTL and TTL compatible. Of course, any storage device having sufficient capacity to accommodate the various combinations of tilt position change commands could be employed.

In the preferred embodiment, the print ball 105 (FIG. 11) is provided with four rows 122, 124, 126, 128 of characters 111. Of course, fewer or more rows of characters could be provided on the print ball. The rows of characters between which the print ball is to be tilted are designated ROW 3, ROW 2, ROW 1 and ROW 0. For convenience, ROW 0 may be designated as the home position character row or tilt position of the print ball after it has completed a forward tilt excursion. The stepper motor 107 may be coupled to the print ball by a pulley system 184 and linkage 186 as shown in FIG. 11.

Being provided with four rows 122, 124, 126, 128 of characters, the print ball 105 must pass through three tilt positions to travel from ROW 3 to ROW 0 or vice versa. Thus, there are 12 possible combinations of actual tilt position changes. Since the print ball may already be positioned in the desired character row, the tilt control logic system must also be able to command the print ball 105 to remain positioned in its present tilt position. Therefore, a total of 16 possible print ball tilt change attempts exist for a print ball 105 having four rows 122, 124, 126, 128 of characters. For a print ball 105 having $n$ rows of characters there are $n^2$ combinations of possible print ball tilt change commands.

Table 3 shows in both 8 bit binary and decimal notation the addresses to the memory element arrays in the ROM corresponding to the 1's complement of the print ball tilt change attempts of Table 2.

TABLE 3

| ROM MEMORY ELEMENT ARRAY ADDRESS | | | | | | | | |
|---|---|---|---|---|---|---|---|---|
| Position Register Output | | | | Counter Output | | | | |
| New | | Old | | | | | | |
| (T1/ | T2/) | (T1/ | T2/) | | | | | Decimal |
| A6 | A7 | A4 | A5 | A0 | A1 | A2 | A3 | Location |
| 0 | 0 | 0 | 0 | 0 | 0 | 0 | 0 | 0 |
| 0 | 0 | 0 | 1 | 0 | 0 | 0 | 0 | 16 |
| 0 | 0 | 1 | 0 | 0 | 0 | 0 | 0 | 32 |
| 0 | 0 | 1 | 1 | 0 | 0 | 0 | 0 | 48 |
| 0 | 1 | 0 | 0 | 0 | 0 | 0 | 0 | 64 |
| 0 | 1 | 0 | 1 | 0 | 0 | 0 | 0 | 80 |
| 0 | 1 | 1 | 0 | 0 | 0 | 0 | 0 | 96 |
| 0 | 1 | 1 | 1 | 0 | 0 | 0 | 0 | 112 |
| 1 | 0 | 0 | 0 | 0 | 0 | 0 | 0 | 128 |
| 1 | 0 | 0 | 1 | 0 | 0 | 0 | 0 | 144 |
| 1 | 0 | 1 | 0 | 0 | 0 | 0 | 0 | 160 |
| 1 | 0 | 1 | 1 | 0 | 0 | 0 | 0 | 176 |
| 1 | 1 | 0 | 0 | 0 | 0 | 0 | 0 | 192 |
| 1 | 1 | 0 | 1 | 0 | 0 | 0 | 0 | 208 |
| 1 | 1 | 1 | 0 | 0 | 0 | 0 | 0 | 224 |
| 1 | 1 | 1 | 1 | 0 | 0 | 0 | 0 | 240 |

In the preferred embodiment, a four-phase variable reluctance stepper motor 107 (FIGS. 5 and 11) is employed for tilting the print ball from one row of characters to another. A variable reluctance stepper motor utilizes a stator 130 which has a plurality of wound poles 132 and a rotor 134 comprising a cylindrical toothed member whose teeth 136 are related to the stator poles in accordance with a desired step angle design. When current is passed through the proper motor windings, a torque is developed which tends to turn the rotor 134 to a stable position of minimum magnetic path reluctance. Energizing a different set of windings causes the rotor 135 to move to a new position of minimum magnetic path reluctance. By properly sequencing the energization of the sets of windings, the rotor may be smoothly rotated around the stator wound poles 132.

Variable reluctance motors, in contrast to permanent magnet motors, are generally simpler in construction and have lower rotor inertia. Variable reluctance motors also have high speed capability when they are lightly loaded. Thus variable reluctance motors lend themselves quite well to printing applications where high speed and accuracy are required. However, variable reluctance motors tend to have poor damping characteristics.

In the preferred embodiment of the invention the motor 107 is sequenced through 12 steps before detenting on phase one 140 when a maximum tilt excursion is executed. In order to maintain synchronization of the tilt control system with the overall printing operation, each tilt command memory element array in the memory 120 is allocated a uniform number of memory element rows.

The memory 120 must be of sufficient capacity to accommodate the total required tilt change commands. A predetermined array of memory elements is allocated for each of the possible tilt change commands. Therefore, in the preferred embodiment of the present invention, since 16 tilt change commands exist, 16 memory element arrays are allocated in the ROM 120.

Table 4 sets forth the entire contents of the ROM 120. The ROM outputs B4, B5, B6 and B7 are employed to energize stepper motor phases ϕ1, ϕ2, ϕ3 and ϕ4, respectively; while ROM outputs B3, B2, B1 and B0 comprise the 4 binary notation of timer preset.

TABLE 4

| Input Address | ROM OUTPUT Stepper Motor Phases | | | | Output Timer Preset | | | |
|---|---|---|---|---|---|---|---|---|
| | ϕ4 | ϕ3 | ϕ2 | ϕ1 | | | | |
| | B7 | B6 | B5 | B4 | B3 | B2 | B1 | B0 |
| 0 – 14 | 0 | 0 | 0 | 1 | 1 | 1 | 1 | 1 |
| 15 | 0 | 0 | 0 | 1 | 0 | 0 | 0 | 0 |
| 16 | 0 | 0 | 1 | 1 | 0 | 1 | 0 | 0 |
| 17 | 0 | 1 | 1 | 0 | 0 | 0 | 1 | 0 |
| 18 | 1 | 1 | 0 | 0 | 0 | 0 | 1 | 0 |
| 19 | 1 | 0 | 0 | 1 | 0 | 1 | 0 | 0 |
| 20 | 1 | 0 | 1 | 1 | 0 | 0 | 0 | 1 |
| 21 – 30 | 0 | 0 | 0 | 1 | 1 | 1 | 1 | 1 |
| 31 | 0 | 0 | 0 | 1 | 0 | 0 | 0 | 0 |
| 32 | 0 | 0 | 1 | 1 | 0 | 1 | 0 | 0 |
| 33 | 0 | 1 | 1 | 0 | 0 | 0 | 1 | 0 |
| 34 | 1 | 1 | 0 | 0 | 0 | 1 | 0 | 1 |
| 35 | 1 | 0 | 0 | 1 | 0 | 1 | 0 | 1 |
| 36 | 0 | 0 | 1 | 1 | 0 | 1 | 0 | 1 |
| 37 | 0 | 1 | 1 | 0 | 0 | 1 | 0 | 1 |
| 38 | 1 | 1 | 0 | 0 | 0 | 0 | 1 | 0 |
| 39 | 1 | 0 | 0 | 1 | 0 | 1 | 0 | 0 |
| 40 | 1 | 0 | 1 | 1 | 0 | 0 | 0 | 1 |
| 41 – 46 | 0 | 0 | 0 | 1 | 1 | 1 | 1 | 1 |
| 48 | 0 | 0 | 1 | 1 | 0 | 1 | 0 | 1 |
| 49 | 0 | 1 | 1 | 0 | 0 | 1 | 0 | 1 |
| 50 | 1 | 1 | 0 | 0 | 0 | 0 | 1 | 1 |
| 51 | 1 | 0 | 0 | 1 | 0 | 1 | 1 | 1 |
| 52 | 0 | 0 | 1 | 1 | 0 | 1 | 1 | 1 |
| 53 | 0 | 1 | 1 | 0 | 0 | 1 | 1 | 1 |
| 54 | 1 | 1 | 0 | 0 | 0 | 1 | 1 | 1 |
| 55 | 1 | 0 | 0 | 1 | 0 | 1 | 1 | 1 |
| 56 | 0 | 0 | 1 | 1 | 0 | 1 | 1 | 1 |
| 57 | 0 | 1 | 1 | 0 | 0 | 1 | 1 | 1 |
| 58 | 1 | 1 | 0 | 0 | 0 | 1 | 0 | 0 |
| 59 | 1 | 0 | 0 | 1 | 0 | 1 | 0 | 1 |
| 60 | 1 | 0 | 1 | 1 | 1 | 0 | 0 | 1 |
| 61 | 1 | 0 | 1 | 1 | 1 | 0 | 1 | 1 |
| 62 | 1 | 0 | 1 | 1 | 1 | 1 | 0 | 1 |
| 63 | 0 | 0 | 0 | 1 | 0 | 0 | 0 | 0 |
| 64 | 1 | 0 | 0 | 1 | 0 | 1 | 0 | 0 |
| 65 | 1 | 1 | 0 | 0 | 0 | 0 | 1 | 0 |
| 66 | 0 | 1 | 1 | 0 | 0 | 0 | 1 | 0 |
| 67 | 0 | 0 | 1 | 1 | 0 | 1 | 0 | 0 |
| 68 | 1 | 0 | 1 | 1 | 0 | 0 | 0 | 1 |
| 69 – 78 | 0 | 0 | 0 | 1 | 1 | 1 | 1 | 1 |
| 79 | 0 | 0 | 0 | 1 | 0 | 0 | 0 | 0 |
| 80 – 94 | 0 | 0 | 0 | 1 | 1 | 1 | 1 | 1 |
| 96 | 0 | 0 | 1 | 1 | 0 | 1 | 0 | 0 |
| 97 | 0 | 1 | 1 | 0 | 0 | 0 | 1 | 0 |
| 98 | 1 | 1 | 0 | 0 | 0 | 0 | 1 | 0 |
| 99 | 1 | 0 | 0 | 1 | 0 | 1 | 0 | 0 |
| 100 | 1 | 0 | 1 | 1 | 0 | 0 | 0 | 1 |
| 101 – 110 | 0 | 0 | 0 | 1 | 1 | 1 | 1 | 1 |
| 111 | 0 | 0 | 0 | 1 | 0 | 0 | 0 | 0 |
| 112 | 0 | 0 | 1 | 1 | 0 | 1 | 0 | 0 |
| 113 | 0 | 1 | 1 | 0 | 0 | 0 | 1 | 0 |
| 114 | 1 | 1 | 0 | 0 | 0 | 1 | 0 | 1 |
| 115 | 1 | 0 | 0 | 1 | 0 | 1 | 0 | 1 |
| 116 | 0 | 0 | 1 | 1 | 0 | 1 | 0 | 1 |
| 117 | 0 | 1 | 1 | 0 | 0 | 1 | 0 | 1 |
| 118 | 1 | 1 | 0 | 0 | 0 | 0 | 1 | 0 |
| 119 | 1 | 0 | 0 | 1 | 0 | 1 | 0 | 0 |
| 120 | 1 | 0 | 1 | 1 | 0 | 0 | 0 | 1 |
| 121 – 126 | 0 | 0 | 0 | 1 | 1 | 1 | 1 | 1 |
| 127 | 0 | 0 | 0 | 1 | 0 | 0 | 0 | 0 |
| 128 | 1 | 0 | 0 | 1 | 0 | 1 | 0 | 0 |
| 129 | 1 | 1 | 0 | 0 | 0 | 0 | 1 | 0 |
| 130 | 0 | 1 | 1 | 0 | 0 | 0 | 1 | 0 |
| 131 | 0 | 0 | 1 | 1 | 0 | 1 | 0 | 0 |
| 132 | 1 | 0 | 1 | 1 | 0 | 1 | 0 | 1 |

TABLE 4-continued

| Input Address | ROM OUTPUT Stepper Motor Phases | | | | Output Timer Preset | | | |
|---|---|---|---|---|---|---|---|---|
| | ϕ4 | ϕ3 | ϕ2 | ϕ1 | | | | |
| | B7 | B6 | B5 | B4 | B3 | B2 | B1 | B0 |
| 133 | 1 | 1 | 0 | 0 | 0 | 1 | 0 | 1 |
| 134 | 0 | 1 | 1 | 0 | 0 | 0 | 1 | 0 |
| 135 | 0 | 0 | 1 | 1 | 0 | 1 | 0 | 0 |
| 136 | 1 | 0 | 1 | 1 | 0 | 0 | 0 | 1 |
| 137 – 142 | 0 | 0 | 0 | 1 | 1 | 1 | 1 | 1 |
| 143 | 0 | 0 | 0 | 1 | 0 | 0 | 0 | 0 |
| 144 | 1 | 0 | 0 | 1 | 0 | 1 | 0 | 0 |
| 145 | 1 | 1 | 0 | 0 | 0 | 0 | 1 | 0 |
| 146 | 0 | 1 | 1 | 0 | 0 | 0 | 1 | 0 |
| 147 | 0 | 0 | 1 | 1 | 0 | 1 | 0 | 0 |
| 148 | 1 | 0 | 1 | 1 | 0 | 0 | 0 | 1 |
| 149 – 158 | 0 | 0 | 0 | 1 | 1 | 1 | 1 | 1 |
| 159 | 0 | 0 | 0 | 1 | 0 | 0 | 0 | 0 |
| 160 – 174 | 0 | 0 | 0 | 1 | 1 | 1 | 1 | 1 |
| 175 | 0 | 0 | 0 | 1 | 0 | 0 | 0 | 0 |
| 176 | 0 | 0 | 1 | 1 | 0 | 1 | 0 | 0 |
| 177 | 0 | 1 | 1 | 0 | 0 | 0 | 1 | 0 |
| 178 | 1 | 1 | 0 | 0 | 0 | 0 | 1 | 0 |
| 179 | 1 | 0 | 0 | 1 | 0 | 1 | 0 | 0 |
| 180 | 1 | 0 | 1 | 1 | 0 | 0 | 0 | 1 |
| 181 – 190 | 0 | 0 | 0 | 1 | 1 | 1 | 1 | 1 |
| 191 | 0 | 0 | 0 | 1 | 0 | 0 | 0 | 0 |
| 192 | 1 | 0 | 0 | 1 | 0 | 1 | 0 | 1 |
| 193 | 1 | 1 | 0 | 0 | 0 | 1 | 0 | 1 |
| 194 | 0 | 1 | 1 | 0 | 0 | 0 | 1 | 1 |
| 195 | 0 | 0 | 1 | 1 | 0 | 1 | 1 | 1 |
| 196 | 1 | 0 | 0 | 1 | 0 | 1 | 1 | 1 |
| 197 | 1 | 1 | 0 | 0 | 0 | 1 | 1 | 1 |
| 198 | 0 | 1 | 1 | 0 | 0 | 1 | 1 | 1 |
| 199 | 0 | 0 | 1 | 1 | 0 | 1 | 1 | 1 |
| 200 | 1 | 0 | 0 | 1 | 0 | 1 | 1 | 1 |
| 201 | 1 | 1 | 0 | 0 | 0 | 1 | 1 | 1 |
| 202 | 0 | 1 | 1 | 0 | 0 | 1 | 0 | 0 |
| 203 | 0 | 0 | 1 | 1 | 0 | 1 | 0 | 1 |
| 204 | 1 | 0 | 1 | 1 | 1 | 0 | 0 | 1 |
| 205 | 1 | 0 | 1 | 1 | 1 | 1 | 0 | 1 |
| 206 | 1 | 0 | 1 | 1 | 1 | 1 | 0 | 1 |
| 207 | 0 | 0 | 0 | 1 | 0 | 0 | 0 | 0 |
| 208 | 1 | 0 | 0 | 1 | 0 | 1 | 0 | 0 |
| 209 | 1 | 1 | 0 | 0 | 0 | 0 | 1 | 0 |
| 210 | 0 | 1 | 1 | 0 | 0 | 0 | 1 | 0 |
| 211 | 0 | 0 | 1 | 1 | 0 | 1 | 0 | 1 |
| 212 | 1 | 0 | 0 | 1 | 0 | 1 | 0 | 1 |
| 213 | 1 | 1 | 0 | 0 | 0 | 1 | 0 | 1 |
| 214 | 0 | 1 | 1 | 0 | 0 | 0 | 1 | 0 |
| 215 | 0 | 0 | 1 | 1 | 0 | 1 | 0 | 0 |
| 216 | 1 | 0 | 1 | 1 | 0 | 0 | 0 | 1 |
| 217 – 222 | 0 | 0 | 0 | 1 | 1 | 1 | 1 | 1 |
| 223 | 0 | 0 | 0 | 1 | 0 | 0 | 0 | 0 |
| 224 | 1 | 0 | 0 | 1 | 0 | 1 | 0 | 0 |
| 225 | 1 | 1 | 0 | 0 | 0 | 0 | 1 | 0 |
| 226 | 0 | 1 | 1 | 0 | 0 | 0 | 1 | 0 |
| 227 | 0 | 0 | 1 | 1 | 0 | 1 | 0 | 0 |
| 228 | 1 | 0 | 1 | 1 | 0 | 0 | 0 | 1 |
| 229 – 238 | 0 | 0 | 0 | 1 | 1 | 1 | 1 | 1 |
| 239 | 0 | 0 | 0 | 1 | 0 | 0 | 0 | 0 |
| 240 – 254 | 0 | 0 | 0 | 1 | 1 | 1 | 1 | 1 |
| 255 | 0 | 0 | 0 | 1 | 0 | 0 | 0 | 0 |

The stepper motor coils are energized via conventional transistor stepper motor drivers 138 in accordance with the tilt command memory elements outputted from the ROM under columns B4, B5, B6 and B7 to the drivers 138 via lines TLT1, TLT2, TLT3 and TLT4, respectively (FIGS. 1 and 3). Phase one (ϕ1) 140 is D.C. coupled in order that one phase may be energized continuously whenever the stepper motor is not rotating in order to detent the stepper motor in a known position. As a safeguard for the motor 107, the remaining three phases, phase two (ϕ2) 142, phase three (ϕ3) 144 and phase four (ϕ4) 146 are A.C. coupled. With phase two, phase three and phase four being A.C. coupled, they will only be energized for a brief time, thereby insuring that the motor 107 cannot burn out if due to a system failure too many phases were energized for an excessive period of time.

Reference may now be had to the edge detector or pulse generator 148 which receives a timing pulse PTU2 which is developed from printer electronics. This timing pulse PTU2 has a predetermined frequency such as 30 cycles per second corresponding to a printing rate of 30 characters per second. At 30 cycles per second the period of a single timing pulse will be 33 milliseconds. This clock pulse synchronizes the electronic tilt control system with the mechanical printing system.

Upon detection by the edge detector 148 of a rising edge of a PTU2 timing pulse, an output LOAD pulse is generated for loading the NEW POSITION/OLD POSITION address register 103 and also a four bit binary counter 150 which is employed to sequence through all of the rows of memory elements for an addressed array of the ROM 101.

The four inputs P0, P1, P2, and P3 to this four bit binary counter 150 (FIG. 4) are grounded for enabling all binary zeros to be loaded into the counter upon receipt of a LOAD pulse from the pulse generator 148 for addressing a particular memory array. The NEW POSITION/OLD POSITION shift register 103 is thereby solely responsible for choosing the proper tilt change command memory array. The four bit binary counter 150 is later incremented during the operation of a tilt system to sequence through a tilt change command, as will be described hereinafter. The outputs Q0, Q1, Q2, and Q3 of this four bit binary counter 150 are directly inputted to the ROM 120.

The output LOAD pulse from the pulse generator 148 is also fed to a pulse delay circuit 152 for delaying the LOAD pulse by one clock time before it is received by a timer 154.

Figure 4:
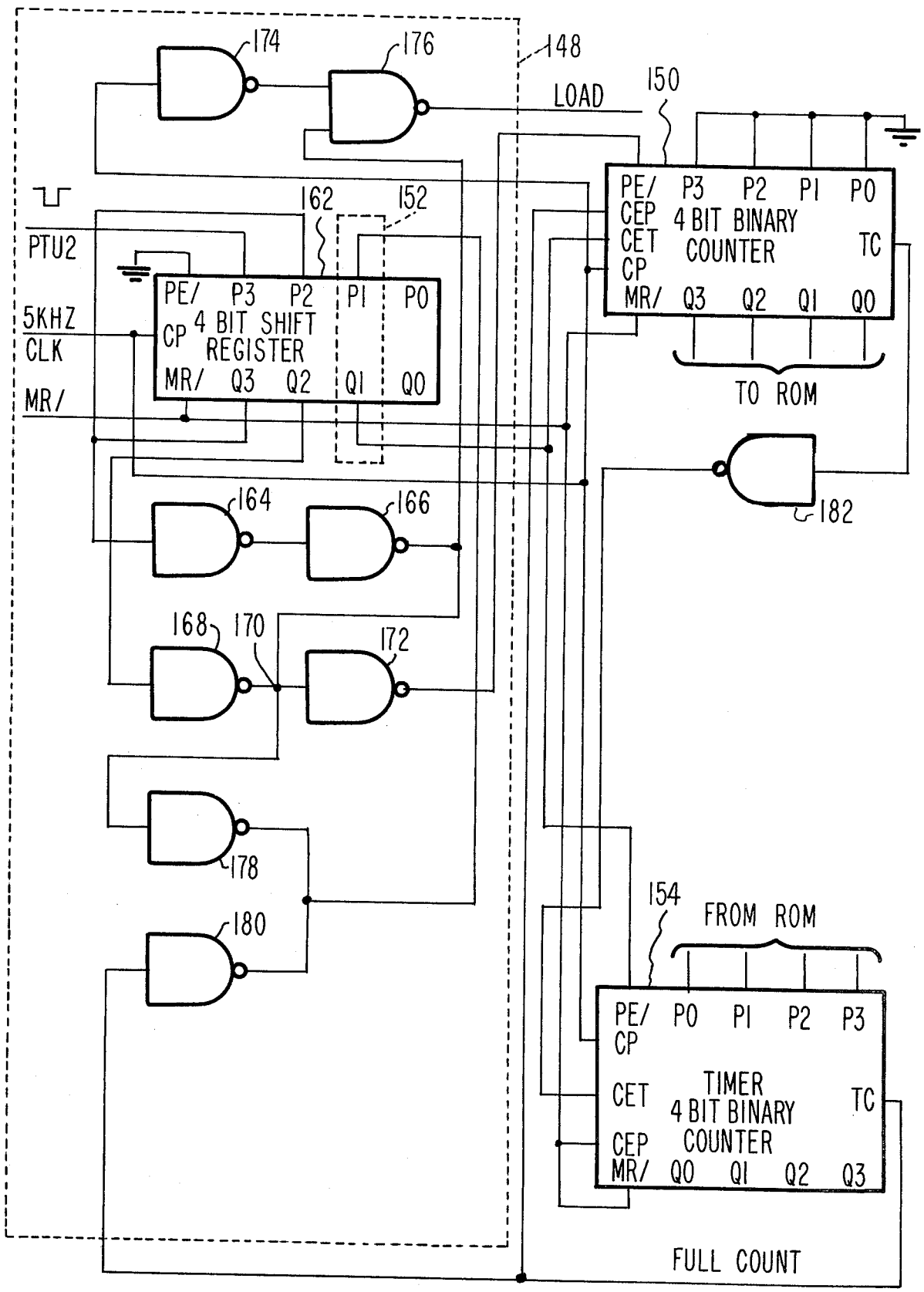
FIG. 4 is a schematic diagram of the edge detection and pulse delay circuits along with the counter which sequences memory element addresses as incremented by the timer.

Thus it can be seen that during the operation of the tilt control logic system that after initialization by the POR/ signal, the LOAD pulse generated from the pulse generator 148 enables the NEW POSITION/OLD POSITION register and the four bit binary counter 150 to determine a particular ROM address. The work or byte in the addressed row of memory elements appears on the output of the ROM. Columns B4, B5, B6 and B7 of the addressed row of memory elements are coupled to the stepper motor drivers 138 on lines TLT1, TLT2, TLT3 and TLT4 respectively. The remaining columns B0, B1, B2, and B3 of that addressed row of memory elements are inputted to the timer 154 which in the preferred embodiment is a four bit binary counter (FIG. 4).

The timer 154 is loaded with this portion of the ROM output upon receipt of the delayed LOAD pulse, and thereby preset to whatever value these memory elements represent. When the timer 154 achieves its maximum count, it generates a FULL COUNT output pulse. This FULL COUNT pulse is employed to increment the four bit binary counter 150 addressing the ROM. The FULL COUNT pulse is also inputted to the pulse delay 152 for loading, one clock time later, the timing portion columns B0, B1, B2 and B3 of the ROM output again into the timer 154. This incrementation of the four bit binary counter 150 continues until it also reaches its maximum count and generates a FULL COUNT output pulse which is fed to the timer 154 for inhibiting further counting by the timer 154 at that point. The FULL COUNT or TERMINAL COUNT output of the four bit counter 150 addressing the ROM indicates that the tilt control logic system has sequenced through all of the memory element rows in the addressed tilt change command array resulting in the stepper motor drivers 138 rotating the stepper motor through the predetermined sequence of steps for changing the print ball tilt position to the desired character row or tilt position.

A detailed description of the edge detector and pulse delay circuit will now be given with reference to FIG. 4. Let us assume that the PTU2 signal has been low. Signal PTU2 is fed to the P3 input of the four bit shift register 162. After a clock pulse has been received by the four bit shift register 162 at its CP input, the PTU2 signal at P3 will also appear at output Q3. This Q3 output is fed back to the P2 input of the four bit shift register 162. The output from Q3 is also twice inverted by two NAND gates 164, 166. The Q2 output is fed into a NAND gate 168. The output of NAND gate 168, which is Q2/, is coupled to the output of NAND gate 166. Thus the Q3 and Q2/ outputs of the four bit shift register 162 are connected in a wired-OR fashion.

The Q2 shift register output will be the same as its Q3 output delayed by one clock pulse since Q2 will follow Q3 by one clock pulse. Thus the output at junction 170 will be low whenever either Q3 or Q2/ are low. Therefore the output of NAND gate 172 will be high only when both Q3 and Q2/ are high. This will only occur for the duration of one clock pulse since Q2/ follows Q3 by one clock pulse. Thus the rising edge of a PTU2 timing pulse is detected when the Q3 output from the four bit shift register 162 goes from a binary zero to a binary one. The output of NAND gate 172 of the edge detector 148 is coupled to the four bit binary counter 150 at its PE/ input which stands for parallel enable.

Upon the detection of a rising edge on signal PTU2, as evidenced by both signals P3 and Q2/ being high, the output of NAND gate 172 will go low and thereby apply a pulse to the parallel enable input PE/ of the four bit binary counter 150 addressing the ROM. Since inputs P0, P1, P2 and P3 of the four bit binary counter 150 are all grounded to binary zero values, these four binary zero inputs will be loaded into the counter 150 upon receipt of the next clock signal CLK by the four bit binary counter 150 at its CP input. The 5KHZ clock pulse CLK is also fed to NAND gate 174 which inverts it and inputs it to NAND gate 176. NAND gate 176 also receives as an input the Q3 and Q2/ outputs from wired-OR NAND gates 166 and 168. The output from NAND gate 176 is coupled to the CP input of the NEW POSITION/OLD POSITION shift register 103 (FIG. 2). A LOAD pulse output here will load the new tilt position and old tilt position data into the NEW POSITION/OLD POSITION shift register 103 as will be explained hereinafter.

Upon the occurrence of the rising edge of PTU2 pulse, resulting in both Q3 and Q2/ going high to a binary one level, a high or binary one signal will also appear at junction 170, as previously explained. This signal is fed into NAND gate 178 where it is inverted and fed back to the P1 input of the four bit shift register 162. The input to NAND gate 180 is from the terminal count output of the timer 154. The output of NAND gate 180 is also inputted to the P1 input of the four bit shift register 162. Therefore, one clock time after a pulse is outputted from either NAND gate 178 or NAND gate 180, that pulse will appear at the Q1 output of the four bit shift register 154.

Thus the P1 input and the Q1 output of the four bit shift register 162 comprise the pulse delay circuit means 152. The output of the pulse delay means 152 at Q1 is coupled to parallel enable input PE/ of the timer 154. Since the previous clock pulse loaded the A0, A1, A2 and A3 ROM inputs from the four bit binary counter 150, Q0, Q1, Q2 and Q3 outputs, the output from the ROM 120 at B0, B1, B2 and B3 will be loaded in parallel into the timer 54 at inputs P0, P1, P2 and P3, respectively.

The pulse delay 152 output signal is also fed to the CET input of the four bit binary counter 150. Thus if the timer 154 should happen to be outputting a terminal count at the time that it receives a parallel enable signal, the four bit binary counter 150 addressing the ROM 120 will be inhibited from counting. The terminal count output on the four bit binary counter 150 is fed through a NAND gate inverter 182 to the count enable input CET on the timer 154 in order to inhibit the counting of the timer 154 when the four bit binary counter 150 reaches terminal count. Whenever the CET input to the timer 154 is low, the TC output of the timer cannot go high.

OPERATION

When power is applied to the printer, or whenever tilt control initialization is desired, an initialization pulse, designated POR/ and standing for power on reset, is inputted to a NEW POSITION/OLD POSITION shift register 103 thereby setting the initial state of the system (FIGS. 1 and 2). The initialization procedure, which commences upon receipt of the POR/ signal by the NEW POSITION/OLD POSITION register 103, results in a maximum forward excursion attempt of the print ball 105 (FIG. 11). A mechanical stop (not shown) inhibits further forward tilt of the print ball 105 after it completes its maximum forward excursion. If the print ball 105 is already in its maximum forward tilt position when the POR/signal is received by the tilt control logic system, then the print ball 105 will merely be maintained against this mechanical stop until the initialization procedure is completed.

This initialization procedure establishes a reference position of the print ball 105 for the tilt control logic system. The tilt position of the print ball 105 must be referenced because the tilt control logic system is an open loop system in which no feedback is provided from the stepper motor 107 to the tilt control logic system.

The POR/ pulse which enables the tilt control system initialization procedure, is received on the master reset MR/ of the NEW POSITION/OLD POSITION shift register 103 clearing all of its outputs Q3, Q2, Q1 and Q0 to binary zero values, (FIG. 2). The binary zeros at the Q3 and Q2 NEW POSITION outputs are fed back to the P1 and P0 OLD POSITION inputs. Upon receipt of a LOAD pulse from the edge detector 148 at the clock pulse input CP, the outputs T1/ and T2/ of the two bit binary latch 101 are loaded into the NEW POSITION portion 102 of the shift register 103 through P2 and P3 inputs respectively. This T1/ and T2/ data will represent a maximum forward tilt attempt for initialization. Remembering that T1/ and T2/ are the 1's complement of PCF code for the desired tilt position and that ROW 0 is the home position, this NEW POSITION data will be binary 11. Thus the output from the NEW POSITION/OLD POSITION shift register 103 for this most forward tilt excursion attempt will be 1100.

At the same clock time that the NEW POSITION/OLD POSITION shift register 103 is loaded, the four bit binary counter 150 receives, at its parallel enable input PE/, a LOAD pulse from the edge detector 148. Since the P3, P2, P1 and P0 inputs to this counter 150 are grounded to a binary zero value, its Q0, Q1, Q2 and Q3 outputs will then be binary zeros.

Therefore, the ROM 102 will receive on its A6, A7, A4, A5, A0, A1, A2 and A3 inputs respectively the binary 1100 0000. This binary number corresponds to digital address 192.

Referring to Table 4, it can be seen that at ROM input address 192 a binary 1 value is present in memory element columns B7 and B4 while binary zero values are present in columns B6 and B5. This indicates that phase four 146 and phase one 140 of the stepper motor 107 are to be energized while phase three 144 and phase two 142 are to remain deenergized, respectively.

The memory element columns B3, B2, B1 and B0 comprise a four bit binary code representing the value at which the four bit binary counter or timer 154 is to be preset. Referring again to Table 4, it can be seen that at ROM input adress 192, the timer preset is a binary 0101 value equivalent to a decimal 5.

Upon receipt by the four bit binary counter 154 at its parallel enable input PE/ of a LOAD pulse from the pulse delay circuit 152, the data at the ROM outputs B0 through B3 will be loaded into the four bit binary counter 154 via P0 through P3 inputs thereby presetting it to a binary 0101.

This counter 154 will thereafter be incremented by each succeeding clock pulse received at its CP input until it reaches its terminal count. In a four bit binary counter the terminal counter is binary 1111 which is equivalent to decimal 15. Therefore, 11 succeeding clock pulses will be received before the timer 154 reaches its terminal count. Thus the stepper motor phase four 146 and phase one 140 will remain energized for these 11 clock pulses.

When the timer 154 reaches terminal count, it outputs a FULL COUNT pulse on output terminal TC to increment the four bit binary counter 150 addressing the ROM by 1. Thus the ROM is incremented to input address 116 and the tilt control logic system will carry out the tilt change command at that address until the timer 154 again reaches terminal count and again increments the four bit binary counter 150 addressing the ROM. This sequencing continues until this counter 150 reaches its terminal count and outputs from its TC output a FULL COUNT pulse inhibiting further ROM address incrementation. Thus the tilt control logic system will have completely sequenced through the ROM memory element array for a most forward tilt excursion attempt.

Upon completion of the initialization procedure the print ball 105 is tilted to its home or most forward position. Then, as is the case whenever the print ball is idling in its home position, the printer carriers form logic 109 is transmitting from lines T2 and T1 binary zero signals. The two bit latch 101 which may comprise a pair of D-type flip flops 156, 158, which are both reset by the output of NAND gate 160, latches onto these two binary zero signals. The $\overline{Q}$ outputs of the flip flops 156, 158 are employed in the preferred embodiment of this invention. Therefore, the T1/ and T2/ outputs of the two bit binary latch 101 are both 1's.

These signals are fed to the two inputs P2 and P3, respectively, of the NEW POSITION portion 102 of the four bit shift register 103. The output of this NEW POSITION portion 102 of the shift register 103 is fed back to the inputs P0 and P1 respectively, of the OLD POSITION portion 104 of the shift register 103. Therefore, binary one signals will also appear at the two OLD POSITION inputs. Thus all four outputs Q0, Q1, Q2 and Q3 of the NEW POSITION/OLD POSITION register 103 will be in a binary one state. Upon receipt of a LOAD pulse from the pulse generator 148, the NEW POSITION/OLD POSITION register 103 output is fed to the ROM 120. The NEW POSITION address bits are the most significant bits of the ROM address and the lowest order bit from the four bit binary counter 150 is the least significant bit of the ROM address. After initialization the input address to the ROM 120 will be 11 11 0000. This is the binary code for decimal address No. 240. Referring to bits B7, B6, B5 and B4 are outputted to the four phases of the stepper motor drivers via lines TLT4, TLT3, TLT2 and TLT1, respectively. ROM output bits B3, B2, B1 and B0 are fed to the timer 154. It can be seen from Table 4 that the output for this address of the ROM is such that only phase one is to be energized for all memory element rows of that array. It should be remembered that this phase one 140 is D.C. coupled to the stepper motor. With phase one being the only phase on, the motor is thereby detented.

The tilt control logic system will continually sequence through the memory element array beginning at address 240, each time a PTU2 pulse is received by the edge detector 148 until a different two bit PCF code T2 and T1 is received by the two bit latch 101.

Figure 5:
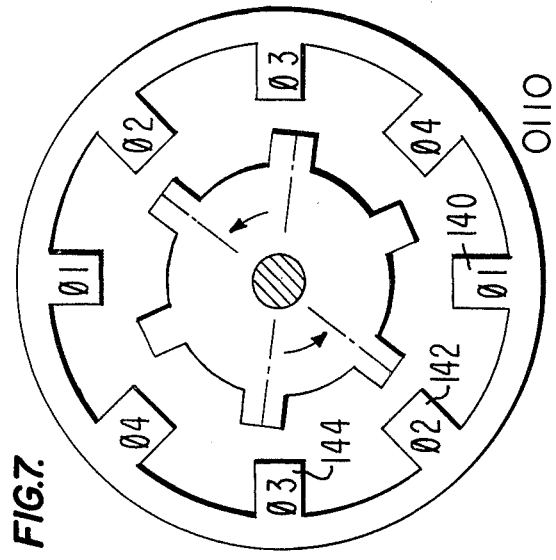
FIGS. 5–10 illustrate the position of the stepper motor rotor relative to the stator as the stepper motor rotation is controlled through a particular sequence of commands.

FIG. 5 illustrates the relative positioning of the stepper motor's wound poles 132 of its stator 130 and the teeth 136 of the rotor 134 when the motor 107 is detented with only phase one 140 being energized. The motor will preferably always be detented with only phase one energized both while the printer is idling and upon completion of each tilt excursion.

Now let us further assume that the first character to be printed is on ROW 2 or tilt position 2 of the print ball. Tilt position 2 is represented on lines T1 and T2 as binary one and zero respectively. The 1's complement of this appearing at the output of the two bit latch will be a 01. The 1's complement of the OLD POSITION which was ROW 0 or tilt position 0 which is now appearing at the input of the OLD POSITION portion of the NEW POSITION/OLD POSITION register is a 11. Thus the binary output of the NEW POSITION/OLD POSITION register will be 0111. The output of the four bit counter addressing the ROM, upon receipt of a LOAD pulse at the counter PE1 input is 0000. Thus the total ROM address for the tilt control command indicating go to ROW 2 from ROW 0 in binary notation is 0111 0000. This binary number in decimal notation is 112.

Referring to the ROM table, it can be seen that at address 112, ROM outputs B4 and B5 are both binary one thereby indicating that phases one and two respectively of the stepper motor are to be energized. Since outputs B6 and B7 are binary zeros, phases three and four are to remain off. The output from the ROM to the timer at address 112 on ROM outputs B3, B2, B1 and B0 are respectively binary 0, 1, 0 and 0. On the next clock pulse the output from the pulse delay circuit generates a LOAD pulse to the timer to load the ROM timer preset output signals into the timer. Thus upon receipt of this LOAD pulse by the timer or four bit binary counter, this binary 0100 output of the ROM, which is equivalent to decimal 4, will be loaded into the timer. Thus the timer is preset to a value of 4.

Since a binary 1111, which is equivalent to decimal 15, is the full count of the timer, 11 subsequent clock pulses will have to be received by the timer before its full terminal count is reached. Since the clock employed in the preferred embodiment is a 5KHZ clock and the timer is counting at this rate which corresponds to 0.2 milliseconds per clock pulse and 11 clock pulses are received before terminal count is reached with the timer being preset a decimal 4 value, the ROM output will remain at address 112 for 2.2 milliseconds. Therefore, phases one and two will remain energized for 2.2 milliseconds before the ROM address is incremented. The timer was preset to a decimal 4 value because 2.2 milliseconds had been experimentally determined as the optional time to rotate the rotor of the stepper motor counterclockwise and one half a step for commencing the smooth transition of print ball tilt position to ROW 2 from ROW 0.

Figure 6:
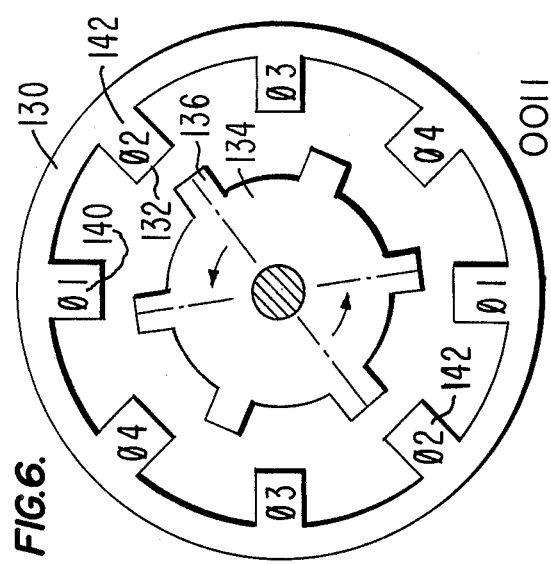

FIG. 6 illustrates the relative positioning of the wound poles 132 of the stator 130 and the teeth 136 of the rotor 134 after phase two 142 has been energized along with phase one 140 for the predetermined optimal time. It can be seen in FIG. 6 that the stepper motor has been rotated one-half a step corresponding to 7.5° Counterclockwise rotation.

After 11 clock pulses have been received by the timer 154 and terminal count is reached, a FULL COUNT output is generated from the timer 154 to the four bit counter 150 indicating that the ROM address is to be incremented by one. Thus the output of the four bit counter 150 changes from 0000 to 0001. The new address to the ROM 120 then becomes 113. From table 4 it can be seen that corresponding to the address 113, the ROM will output at column B4 that phase one 140 is to be deenergized, while at column B5 that phase two 142 is to remain energized and at column B6 that phase three 144 is to now be energized while at column B7 that phase four 146 remains off.

The length of time that phase two 142 and phase three 144 are to remain energized is determined by the predetermined timer preset in memory element columns B0, B1, B2 and B3. At address 113 this timer preset is a binary 0010 which is equivalent to a decimal 2. On the next clock pulse received by the timer 154 the timer preset output of the ROM 120 will be loaded into the timer 154 thereby presetting it to that value. Thirteen subsequent clock signals will then be received by the timer 154 before it reaches its terminal count of 15. Phases two 142 and three 144 will therefore be energized for 13 clock pulses of 0.2 millisecond duration each for a total of 2.6 milliseconds before the address register is incremented to decimal address 114.

Figure 7:
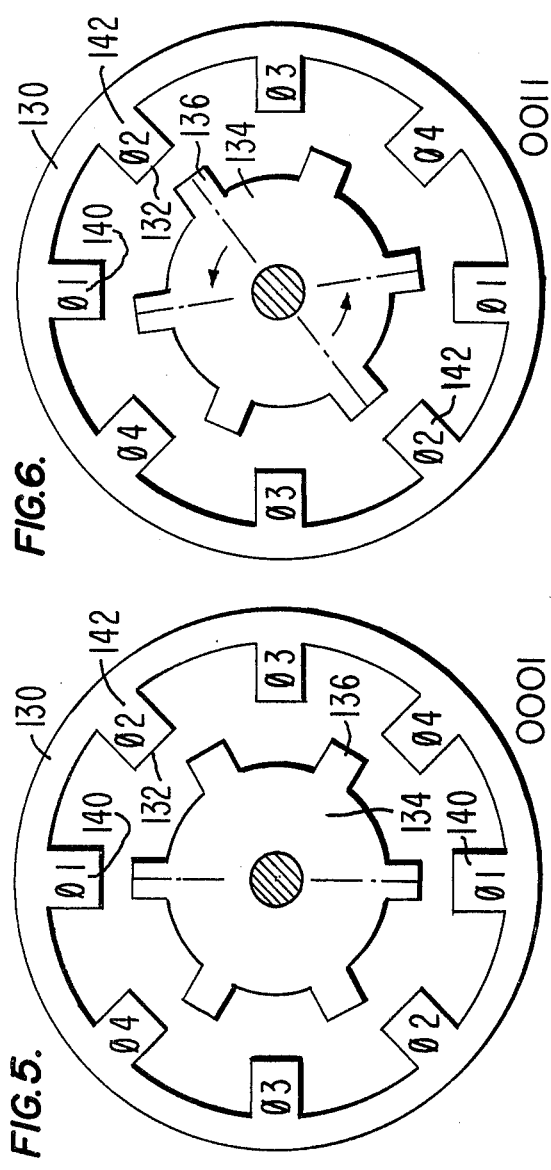

Referring now to FIG. 7, the rotation of the rotor one step of 15° in the counterclockwise direction is shown as resulting from the tilt command at address 113 turning off phase one 140 leaving phase two 142 on the energizing phase three 144.

Figure 8:
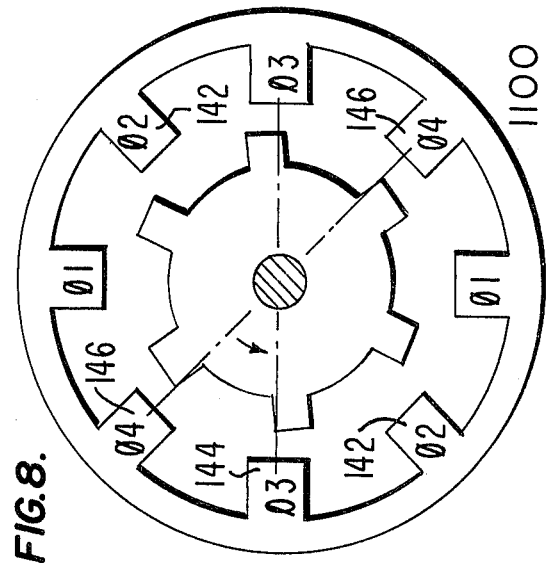

At decimal address 114 it can be seen that phase two 142 is deenergized while phase three 144 remains energized and phase four 146 is now energized. On the next clock pulse received by the timer 154 it is preset with a value of 5 corresponding to the timer preset ROM output at address 114. As explained previously, since the terminal count of the timer is 15, 10 subsequent clock pulses will have to be received by the timer 154 before the address is again incremented. Phases three 144 and four 146 will therefore remain energized for 2 milliseconds. This results in the rotor being rotated another step of 15° as illustrated in FIG. 8.

Figure 9:
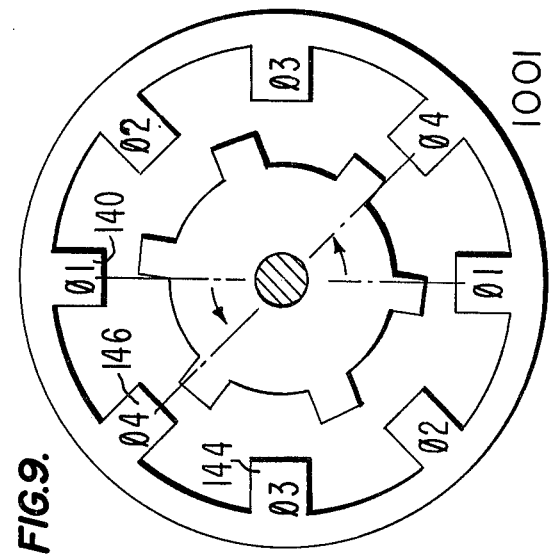

At decimal address 115, phase three 144 is turned off while phase four 146 remains on and phase one 140 is turned on. Phases one and four will remain on for 2 milliseconds corresponding to the timer preset in address 115 of the ROM. This results in the rotor being further rotated an additional 15° step as illustrated in FIG. 9. The tilt command bytes in memory element rows at ROM addresses 116 through 119, which are given in table 4, repeat the sequencing as illustrated in FIGS. 5 through 9. However, since the print ball 105 has already been rotated four and one half steps closer to its destination, the optimal timer presets which are also given in Table 4 are different. The timer presets are such that smooth transition between the remaining steps will continue without any oscillations during the travel of the print ball 105. These optimal preset times which were experimentally determined, also enable the print ball 105 to land at its character row destination with substantially no overshoot or oscillations.

At address 116 of the ROM, phase four 146 is turned off while phase one 140 remains on and phase two 132 is energized. Phases one and two will remain on for 2 milliseconds before the address is incremented. At address 117, phase one is turned off while phase two remains on and phase three is turned on. Phases two and three will remain energized for 2 milliseconds as specified by the timer preset at address 117. At address 118 phase two is turned off while phase three remains on and phase four is energized. Since the timing preset command at address 118 has a value of 2, phases three and four will remain energized for 2.6 milliseconds. At address 119, phase three is turned off while phase 4 remains on and phase one is energized. The timing preset at address 119 dictates that phases one and four will now be on for 2.2 milliseconds.

Figure 10:
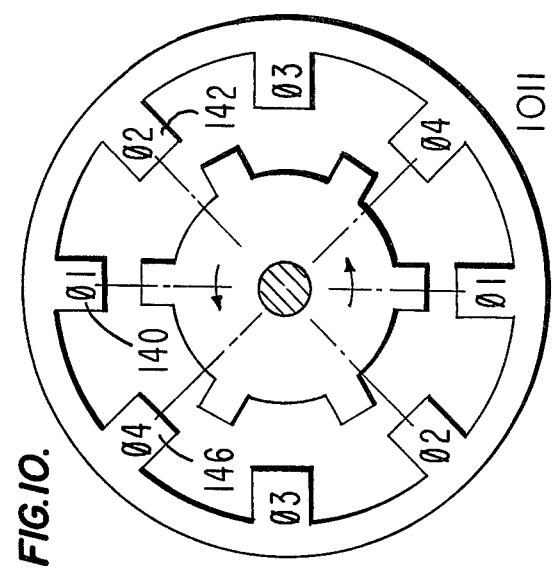

At address 120 both phases one 140 and four 146 remain on while phase two 142 is additionally energized. These three phases 140, 146, 142 are energized to damp the stepper motor as the tilt ball 105 arrives at its destination. These three phases are energized according to the timing preset command at address 120 for 2.8 milliseconds. The effect that the tilt command byte at ROM address 120 has on the rotation of the stepper motor rotor is illustrated in FIG. 10. The rotor is only rotated an additional one half step of 7.5° by energizing phase two in addition to phases one and four. By energizing these three phases at this point in the sequence, a strong braking effect on the stepper motor 107 is achieved thereby enabling the print ball 105 to land without undesirable oscillations.

At this point the stepper motor 107 has traveled through eight steps. Since four steps correspond to the space to be traveled between adjacent rows of characters, eight steps correspond to the print ball 105 being tilted through two rows of characters.

When the ROM 120 has been sequenced through a sufficient number of addresses for a given memory element array that the print ball should have been tilted to and landed at the destination character row, then for the remaining addresses in the given array the stepper motor will be detented with only phase one being energized. Detenting the stepper motor with phase one provides a reference for any subsequent change in tilt position of the print ball 105.

Except for the last address in any given memory element array, the remaining timing presets will be such that the output of the ROM 120 will load a terminal count into the timer 154 on each clock pulse. Therefore, a FULL COUNT pulse will be generated from the timer 154 upon each of these subsequent clock pulses, resulting in a rapid incrementation of the four bit binary counter address unit 150. A zero timer preset is loaded into the timer 154 at the last address of a given memory element array in order to prepare the timer 154 for subsequent tilt position changes.

While the tilt command bytes at addresses 121 to 126 are not employed to change the tilt position of the print ball 105 in the present example, they are provided to maintain the dimensional uniformity of all of the memory element arrays. Since 16 addresses of memory element rows may be required for a full excursion of the print ball 105 from one extreme character row to the other, each memory element array of the ROM is allocated 16 addresses, in the preferred embodiment in order to avoid the timing complexities that would otherwise result in maintaining synchronization of the tilt control logic with the mechanical system of the printer.

For further illustration of the operation of the tilt control logic system of the present invention, let us now assume that the next character row destination instruction generated by the printer carrier forms (PCF) logic 109 is ROW 1. At the conclusion of the previously described change in tilt position from ROW 0 to ROW 2, the NEW POSITION portion 112 of the address register 113 has a binary 01 stored therein. This is the 1's complement of binary 10. The OLD POSITION portion 114 of the address register 113 will have a binary 11 stored therein, which is the 1's complement of binary 00. The printer carrier forms logic 109 will provide a binary zero on T1 and a binary one on T2 representative of the new ROW 1 destination.

Line T2 is the most significant bit of the information from the printer carriers form logic 109. Therefore, with an instruction of go to ROW 1 from the printer carriers forms logic 109, line T2 will have a zero and line T1 will have a one. This information is inputted to the two bit binary latch 101 whose output is the 1's complement for this information, or a binary 1 0. On the next detected PTU2 timing pulse, the tilt position stored in NEW POSITION 102 which had been a 0 1, the 1's complement of ROW 2, is loaded into the OLD POSITION portion 104 of the NEW POSITION/OLD POSITION address register 103. The NEW POSITION portion 102 of the NEW POSITION/OLD POSITION register 103 will now have a binary 1 0 as received from the two bit latch 101. Remember, this 1 0 is the 1's complement of the binary code for ROW 1. The four bit binary counter timing address unit 150 is reset upon receipt of a LOAD pulse to all zeros. Thus the new address for the ROM 120 is in binary notation 10010000. This address register 103, 150 output is representative of the instruction go to ROW 1 from ROW 2. Binary 1001000 is equivalent to decimal address 144. Thus ROM address 144 will be the first address of the ROM memory element array which will be consecutively sequenced for specific commands to change the tilt position of the print ball 105 from ROW 2 to ROW 1.

Referring back to the ROM Table 4 at address 144, phases one and four are turned on thereby rotating the rotor of the stepper motor 107 in a clockwise direction. This results in a half step rotation of 7.5° in clockwise direction from the detented position where only phase one is energized. It can also be derived from Table 4, as previously explained, that at address 144 phases one and four will be kept on for 2.2 milliseconds as determined by the timer preset of binary 0100. After this time the address to the ROM 120 will be incremented by one, also as previously explained, to ROM address 145.

According to the byte of information in the memory element row at address 145, phase one is turned off, while phase four is left on and phase three is turned on. This corresponds to one complete step of rotation of the stepper motor 107. It also can be derived from Table 4 that at address 145, phases three and four are maintained on for 2.6 milliseconds. The ROM address is then incremented to address 146.

At address 146, phase four is turned off while phase three is maintained on and phase two is now turned on. This also corresponds to another complete step of the motor 107.

After the 2.6 millisecond timing for these phases as provided in address 146, the ROM address is incremented to address 147. At address 147, phase three is turned off while phase two is maintained on and phase one is now turned on. As per the tilt command byte at address 147, these phases one and two are maintained on for 2.2 milliseconds.

After this the motor will have rotated through three and one-half steps. Since only four steps are required to travel from one character row to an adjacent row, only one-half step of rotation then remains to be completed in order for the print ball 105 to be tilted from ROW 2 to ROW 1. In order to smoothly rotate this one-half step and to brake the motor while preventing any oscillations after landing at the desired character row, phases one, two and four are energized as per the information byte in the memory element row at the next address 148. This hard braking is maintained for 2.8 milliseconds as per the timing preset at address 148.

What is claimed is:

1. An open loop digital logic system for controlling the tilt position of a print head in accordance with data representative of a desired print head tilt position, comprising:
   means for storing data representative of predetermined print head tilt position change commands;
   means responsive to said desired print head tilt position data for addressing a portion of said data storing means; and
   means responsive to said predetermined print head tilt position change commands data at said addressed portion of said data storing means for timed sequencing of said addressed portion enabling smooth transition of said print head to said desired print head tilt position.

2. The open loop digital logic system of claim 1 wherein said addressing means comprises:
   a shift register;
   means for latching said desired print head tilt position data;
   means for loading said latched data into a first portion of said shift register; and
   means for loading data previously loaded into said first portion of said shift register into a second portion of said shift register.

3. The open loop digital logic system of claim 1 wherein said means for timed sequencing comprises:
   a timer; and
   means responsive to said timer for incrementing the address of said addressed portion of said storing means.

4. The open loop digital logic system of claim 3 wherein said print head tilt change commands data at said addressed portion includes predetermined timer preset values for presetting said timer.

5. An open loop digital logic system for controlled energization of selected phases of a multi-phase stepper motor for smooth rotation from a first position to a second desired position, comprising:
   means for receiving data representative of said second desired position;
   memory means for storing a plurality of memory element arrays each having a plurality of memory element rows and a plurality of memory element columns;
   a first plurality of said memory element columns having data representative of said selected phases, said first plurality of memory element columns operatively coupled to said selected phases;
   a second plurality of said memory element columns having data representative of predetermined timer preset values;
   means responsive to said data receiving means for addressing a particular one of said plurality of memory element arrays; and
   means responsive to said second plurality of said memory element columns for sequencing through said plurality of memory element rows for precise periods of time in accordance with said predetermined timer preset values.

6. An open loop digital logic system for continuously controlled positioning of a tiltable print head in accordance with data reepresentative of a desired print head tilt position, comprising:
   a multiphase stepper motor for tilting said print head to said desired tilt position in response to stored data representative of energization and de-energization of selected phases of said multiphase stepper motor;
   means for receiving said data representative of said desired print head tilt position;
   means for storing data representative of predetermined energization and de-energization of selected phases of said stepper motor;
   means responsive to said received desired print head tilt position data for addressing a predetermined portion of said data storing means; and
   means responsive to said stored data at said addressed portion for timed sequencing of said energization and de-energization data at said addressed portion of said data storing means for enabling smooth transition of said print head to said desired print head tilt position.

7. The open loop digital logic system of claim 6 wherein said data storing means comprises a memory having a plurality of memory element arrays, each of said plurality of memory element arrays including a predetermined plurality of memory element rows for storing a particular combination of said selected phase energization and deenergization data.

8. The open loop digital logic system of claim 7 wherein each of said plurality of memory element arrays further includes a first plurality of memory element columns for storing said particular combination of said selected phase energization and de-energization data and a second plurality of memory element columns for storing predetermined timing data for enabling said timed sequencing means.

9. The open loop digital logic system of claim 8 wherein said addressing means comprises register means, including a first portion coupled to said data receiving means for temporarily storing said received desired print head tilt position data, and a second portion; said addressing means further comprising means for loading said data stored in said first portion into said second portion for addressing a particular one of said memory element arrays.

10. The open loop digital logic system of claim 8 wherein said timed sequencing means comprises means responsive to said second plurality of memory element columns for incrementing said addressing means at predetermined optimal times derived from said timing data stored at said second plurality of memory element columns for sequencing through said plurality of memory element rows at said addressed memory element array.

11. In a printer employing a tiltable print head having a plurality of character rows associated with predetermined print head tilt positions, the improvement comprising:
  a multiphase stepper motor operatively coupled to said print head for tilting said print head to a position corresponding to a desired one of said plurality of character rows; and
  open loop digital logic means for time controlled sequencing of selected phases of said multiphase stepper motor.

12. In the printer of claim 11, the improvement wherein said open loop digital logic means comprises:
  means for receiving data representative of one of said tilt positions;
  means for storing a plurality of predetermined stepper motor phase energization and de-energization and timing preset patterns;
  means responsive to said received data for addressing a particular one of said plurality of stored patterns; and
  means responsive to said addressed pattern for timed sequencing through the phase energization and deenergization pattern at said addressed pattern.

13. In the printer of claim 12, the improvement wherein said storing means comprises a memory having a plurality of memory element arrays for storing said patterns.

14. In the printer of claim 13, the improvement wherein each of the plurality of memory element arrays includes a first plurality of memory element columns for storing one of said predetermined stepper motor phase energization and de-energization patterns, and a second plurality of memory element columns for storing one of said predetermined timing preset patterns, said second plurality of memory element columns for enabling said timed sequencing means.

15. In the printer of claim 12, the improvement wherein said data receiving means comprises means for latching data representative of said desired character row.

16. In the printer of claim 15, the improvement wherein said addressing means comprises register means for retaining said latched data.

17. In the printer of claim 16, the improvement wherein said register means includes a first portion for retaining said latched data and a second portion for retaining data received from said first portion.

18. In the printer of claim 17, the improvement further comprising means for loading said latched data into said first portion while simultaneously loading data retained in said first portion into said second portion.

19. In the printer of claim 18, the improvement wherein said loading means further comprises means for delayed loading of said timer preset pattern into said timed sequencing means.

* * * * *